Figures 1, 2, 4:
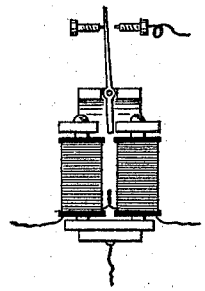

(No Model.)  6 Sheets—Sheet 1.

G. W. WHITTEMORE, J. A. BARRETT & W. M. CRAFT.
SELECTIVE SIGNALING CIRCUIT, APPARATUS, AND SYSTEM.

No. 582,107.  Patented May 4, 1897.

Current Combinations.

|   | Line A. | Line B. | Ground. |
|---|---------|---------|---------|
| 1 | +       | 0       | −       |
| 2 | −       | 0       | +       |
| 3 | 0       | +       | −       |
| 4 | 0       | −       | +       |
| 5 | +       | −       | 0       |
| 6 | −       | +       | 0       |
| 7 | +       | +       | −       |
| 8 | −       | −       | +       |

Attest.

Inventors.
Geo. W. Whittemore,
J. A. Barrett,
Warren M. Craft,
by Pollok & Mauro,
their attorneys.

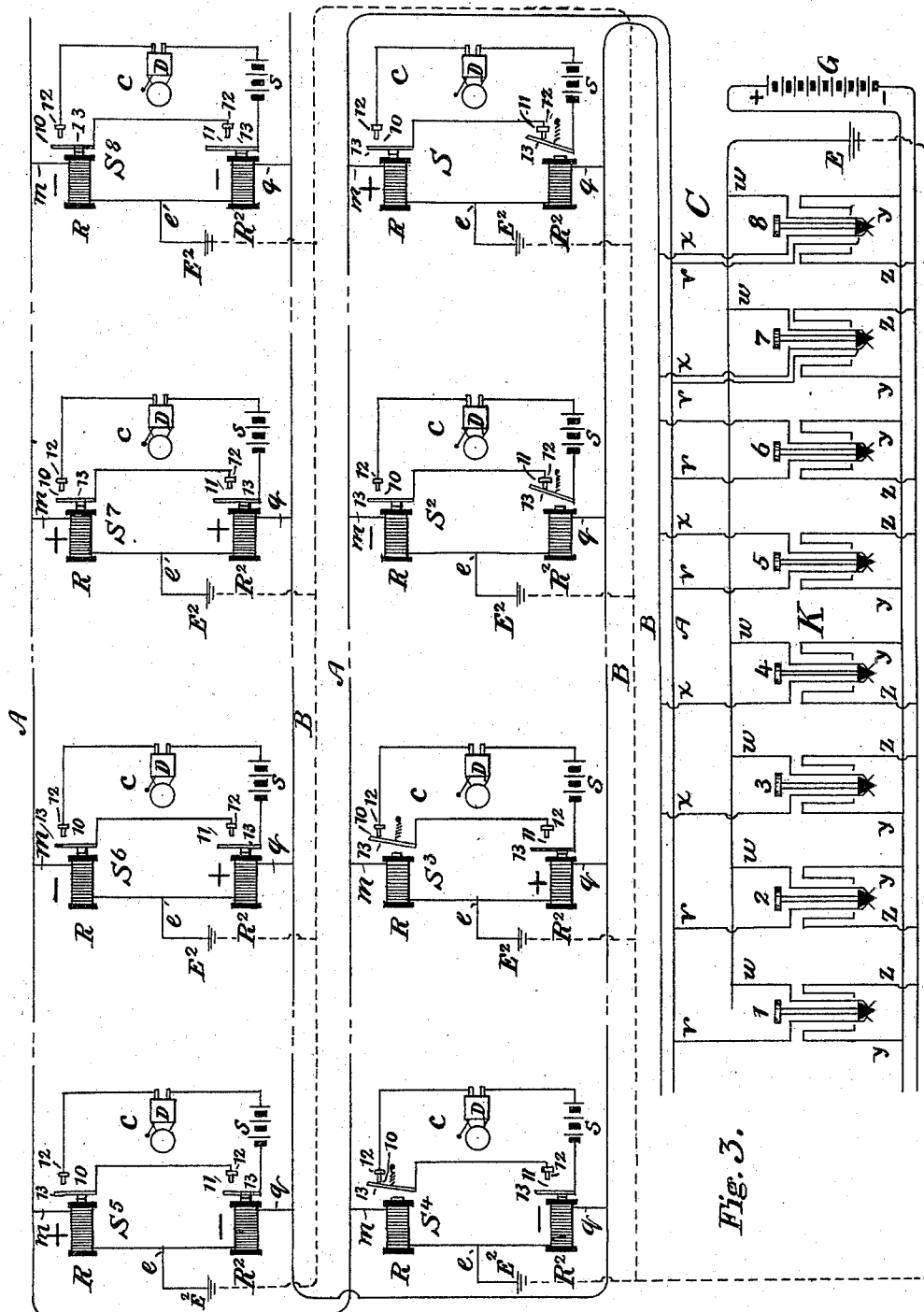

(No Model.) 6 Sheets—Sheet 3.

G. W. WHITTEMORE, J. A. BARRETT & W. M. CRAFT.
SELECTIVE SIGNALING CIRCUIT, APPARATUS, AND SYSTEM.

No. 582,107. Patented May 4, 1897.

Attest.
J. T. Cameron
W. R. Edelen.

Inventors,
Geo. W. Whittemore, J. A. Barrett,
& Warren M. Craft.
by Pollok & Mauro
their attorneys (No Model.) 6 Sheets—Sheet 4.
G. W. WHITTEMORE, J. A. BARRETT & W. M. CRAFT.
SELECTIVE SIGNALING CIRCUIT, APPARATUS, AND SYSTEM.
No. 582,107. Patented May 4, 1897.
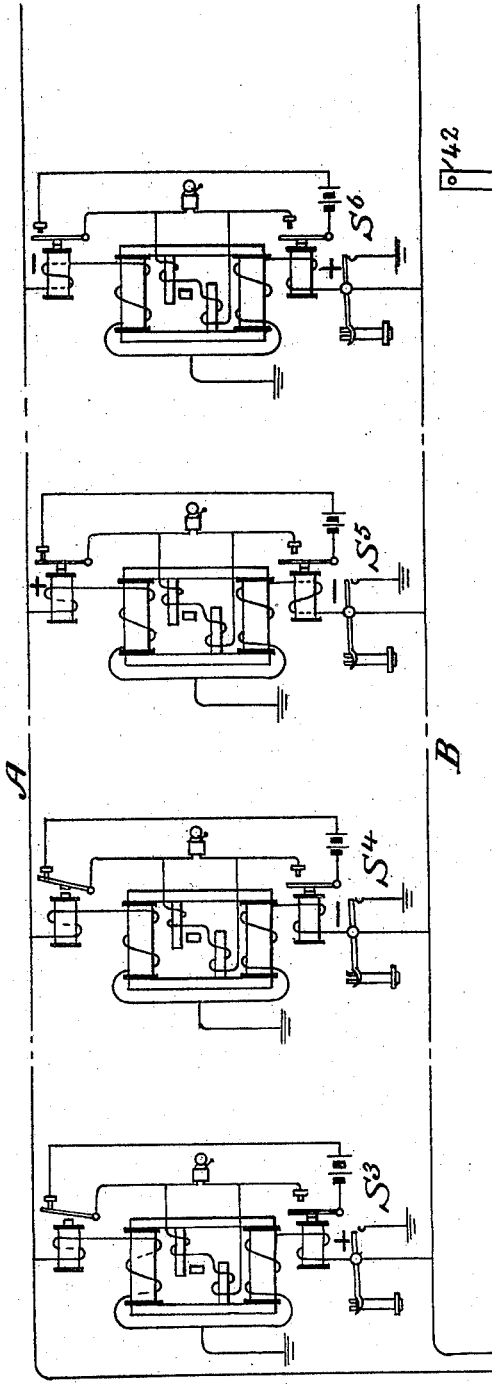
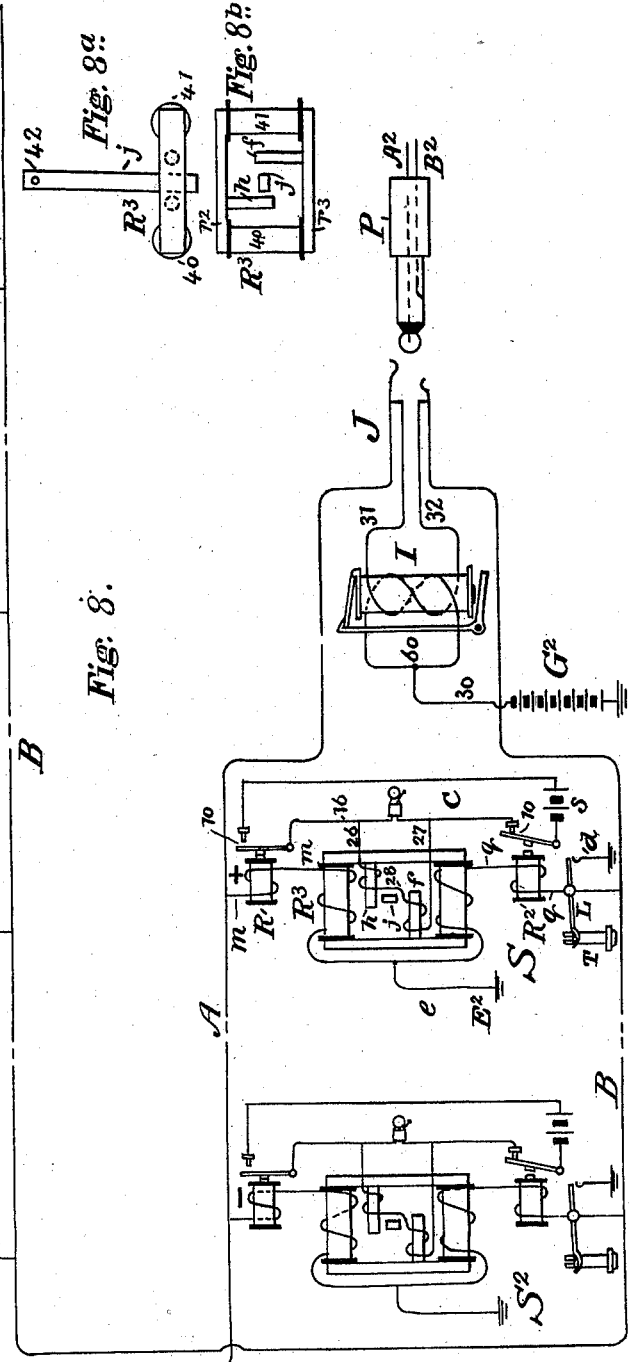
Attest.
Inventors,
Geo. W. Whittemore,
John A. Barrett,
Warren M. Craft, (No Model.) 6 Sheets—Sheet 5.

G. W. WHITTEMORE, J. A. BARRETT & W. M. CRAFT.
SELECTIVE SIGNALING CIRCUIT, APPARATUS, AND SYSTEM.

No. 582,107. Patented May 4, 1897.

Current Combinations.

| | Line A. | Line B. | Ground. |
|---|---|---|---|
| 1 | + | 0 | − |
| 2 | − | 0 | + |
| 3 | 0 | + | − |
| 4 | 0 | − | + |
| 5 | + | − | 0 |
| 6 | − | + | 0 |
| 7 | − | + | − |
| 8 | + | − | + |
| 9 | + | − | − |
| 10 | − | + | + |
| 11 | + | + | − |
| 12 | − | − | + |

Attest.

J. I. Cannon
W. R. Edelen.

Inventors,
Geo. W. Whittemore
J. A. Barrett & Warren M. Craft,
by Leonard Mauro
their attorney

United States Patent Office.

GEORGE W. WHITTEMORE AND JOHN A. BARRETT, OF BROOKLYN, AND WARREN M. CRAFT, OF NEW YORK, N. Y., ASSIGNORS TO THE AMERICAN TELEPHONE AND TELEGRAPH COMPANY OF NEW YORK.

SELECTIVE SIGNALING CIRCUIT, APPARATUS, AND SYSTEM.

SPECIFICATION forming part of Letters Patent No. 582,107, dated May 4, 1897.

Application filed November 28, 1896. Serial No. 613,754. (No model.)

*To all whom it may concern:*

Be it known that we, GEORGE W. WHITTEMORE and JOHN A. BARRETT, residing at Brooklyn, and WARREN M. CRAFT, residing at New York, State of New York, have invented certain Improvements in Selective Signaling Circuits, Apparatus, and Systems, of which the following is a specification.

This invention relates to selective electrical signals, and more particularly to that class wherein main-line currents of different direction are employed to operate polarized signal-receiving instruments at the subscribers' stations.

The object of the invention is to provide means for selectively signaling the several subscribers' stations of a party-line telephone-circuit, which means shall be economical and convenient and so simple that no specially-constructed instruments or complex mechanism shall be required, and that each station may be signaled by pressing a single key corresponding to and representing such station.

In our invention by placing two relays at each subscriber's station, by utilizing in signaling both conductors of the metallic telephone-circuit, and by transmitting currents of both directions or polarities from a central-station call-current generator over these conductors, separately and combined, as many as twelve different current combinations can be made and usefully employed, so that, if necessary or desirable, twelve stations of the same circuit can selectively be called. It is, however, an unusual practice to place as many as twelve stations on any one circuit, and thus when any ten or lesser number of these currents or combinations of currents are employed in selectively operating the signals of a like number of stations two of the remaining combinations can be employed to work interruption-preventing apparatus at all stations except the one which is wanted or which has been called.

Our invention provides that two main conductors (generally the outgoing and return wires of a telephone-circuit) shall extend from the central station to a number of substations. As many as twelve substations may, if desired, be connected with this circuit; but practice has indicated that the connection of a lesser number is to be preferred. A convenient arrangement is to assign six substations to one main circuit. At each substation we provide a local signaling-circuit which contains the signal-receiving device, (a call-bell being commonly used,) and the said local circuit is normally open and is capable of being opened and closed at two distinct points, so that the bell included therein can only be operated to give the signal when the circuit is closed at both such points, and when consequently the current of its local battery is permitted to circulate therein and through the call-bell magnet-coils. Two relays are also placed at each substation and are connected in derived circuits, such as branches to earth, or to a suitable return-conductor from the two main conductors respectively. These jointly control the local circuits, the two relays of each pair being arranged to govern, respectively, the two opening and closing points of their own local circuit.

The relays of the several stations may be associated in a variety of ways with their main-conductor derived circuits, and while at some stations each one may be arranged in its own earth branch at others one only may be in the particular branch of the main conductor and the other in a common earth-conductor formed by the junction of the branches from both conductors. The pairs of relays may, furthermore, be diversely arranged at the several stations with respect to their character, polarity, and mode of connection with the circuit main conductors, some stations being provided with a neutral relay and a polar relay and others with two polar relays, and it is obvious that the polar relays associated with the two main conductors may be arranged or connected to respond to either plus or minus currents—that is to say, to currents of either direction. At all stations, however, the two relays must both be in position to close the points of the local circuit which they respectively control in order that the signal may be given, and when both are in such position they may be said to "coöperate" in closing the local bell-circuit.

In accordance with our invention each of these pairs of relays coöperate to give the signal for the station where they are located in response to a definite current combination transmitted from the central station over the main conductors and to no other, the combination being different for each station, and they therefore are necessarily so arranged that the special combination of current which is required to enable the two relays of any particular station to hold the local circuit closed at both of its controlled points will at all other stations be ineffectual to perform that office or will indeed act to maintain the discontinuity of the local circuits at the said station at least at one point.

To produce the appropriate number of current combinations required for the selective operation of the several pairs of substation-relays, and for such other circuit operations as are desired, we associate at the central station with the two main-conductor terminals a suitable source of signaling-current, such as a voltaic battery or magneto-electric generator, an earth connection having free terminals, and a group of circuit-changing signaling-keys, one key for each of the several different combinations which are to be produced. These keys control the connection between the main-conductor terminals, the generator-terminals, and the earth-connection terminal, each key being so organized that when pressed it will establish a relation between the said terminals differing from that which would be established by the operation of any other key and will therefore transmit over one or both of the main conductors a particular current or combination of currents differing from that which would be transmitted by any other key. By this arrangement the operation of any one key will result in the coöperative action of the two relays, the closing of the local circuit, and the giving of the signal at the substation corresponding to and represented by the said key and at no other, so that we may say that the operation of any particular key will ring the bell of one particular and corresponding substation.

It is desirable that when any station is using the main circuit for conversation other stations shall not interfere by calling the central station, connecting their telephones, or by other forms of interruption. To this end we place at each station, in circuit with the station-relays, a polarized electromagnet whose armature is responsive in one direction to a particular central-station key-and-current combination and in the other direction to another key-and-current combination. We find it convenient for this purpose to employ two neighboring keys and like but opposed current combinations.

The special polarized magnets of all stations are constructed and are arranged alike, and their armature-levers are arranged to carry a visual busy-signal and to serve as a locking device for the automatic telephone-switch. Thus while the circuit is at rest the said armature-levers are permitted to occupy a given position where the busy-signal is concealed and where the movement of the hook switch-levers is not opposed; but when the circuit is to be used at any station the proper current combination is transmitted and the polarized magnets of the several stations respond, bringing their signals into sight and bringing a mechanical stop into the path of the hook switch-lever so that it cannot bring the station-telephones into the main circuit. When the use of the line is discontinued, an opposed-current combination may be transmitted to withdraw the busy-signals and free the switch-levers.

It is often necessary to set the locking devices before the main circuit is finally switched for conversation, and when this is done means must be provided for the release of the apparatus at the particular station which is to be called or which has called and which in either case is to be concerned in the ensuing conversation. We provide such means by giving to a portion of the iron core of the special polar relay of the several stations an auxiliary exciting coil or winding and by including the same in the local bell-circuit or in a branch thereof. The current in such local circuit is always of uniform direction, which it is easy to arrange shall be the direction required to operate the release of the locking device, and it follows that since the local circuit of the particular station which is called is alone closed the instruments at such station only are released and those of the others remain locked until they are simultaneously freed at the close of the conversation.

Figure 5:
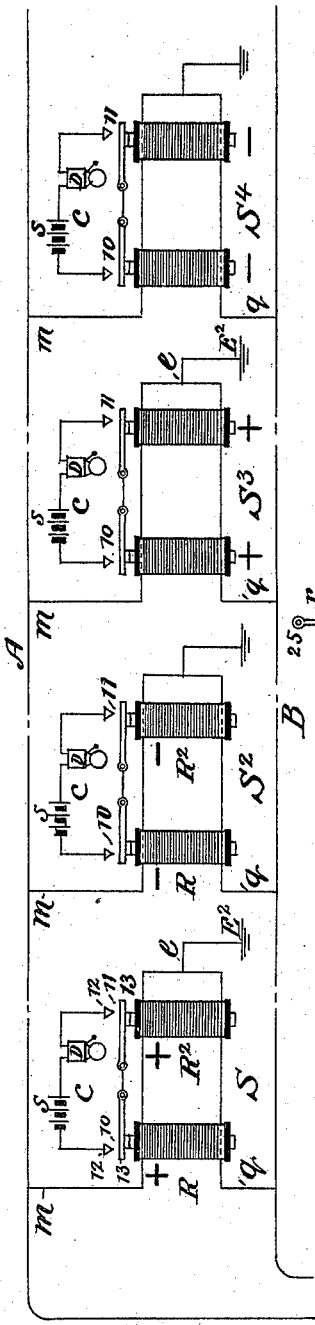
Figure 6:
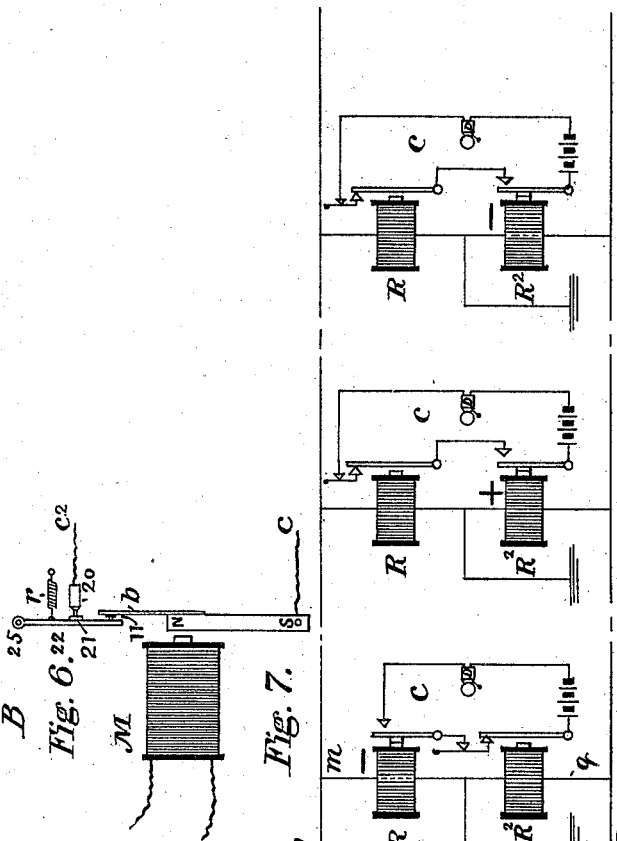
Figure 7:
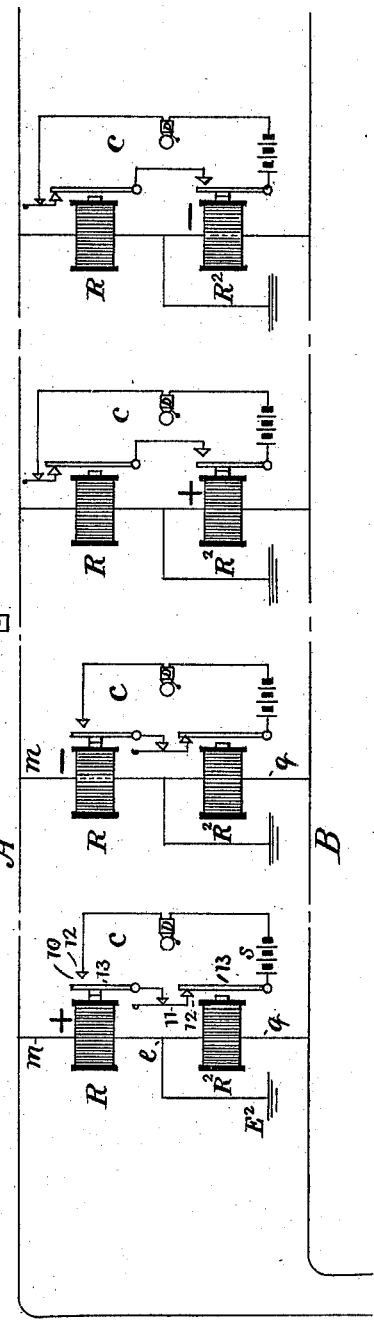
Figure 9:
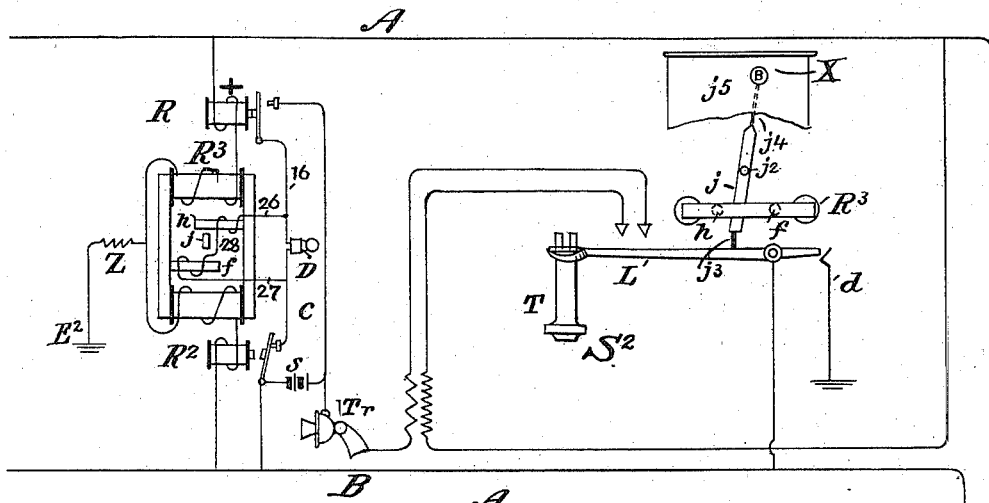
Figure 10:
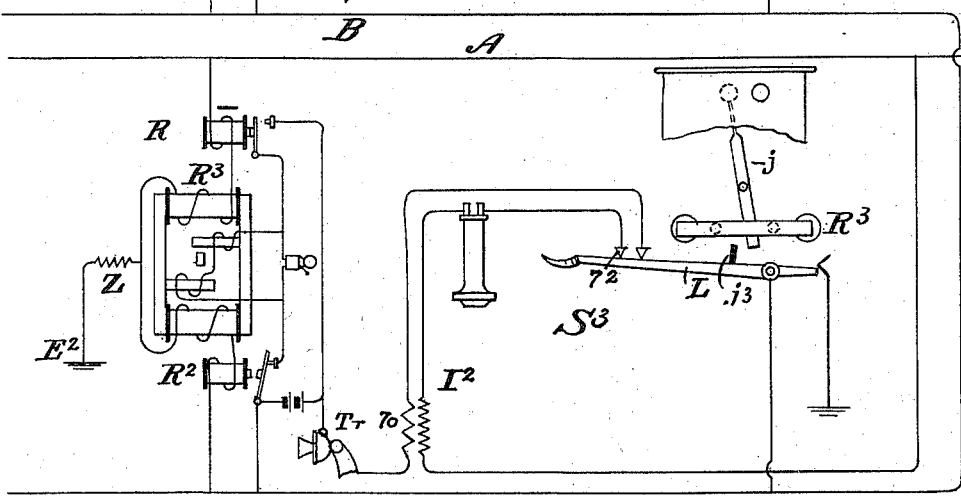
Figure 11:
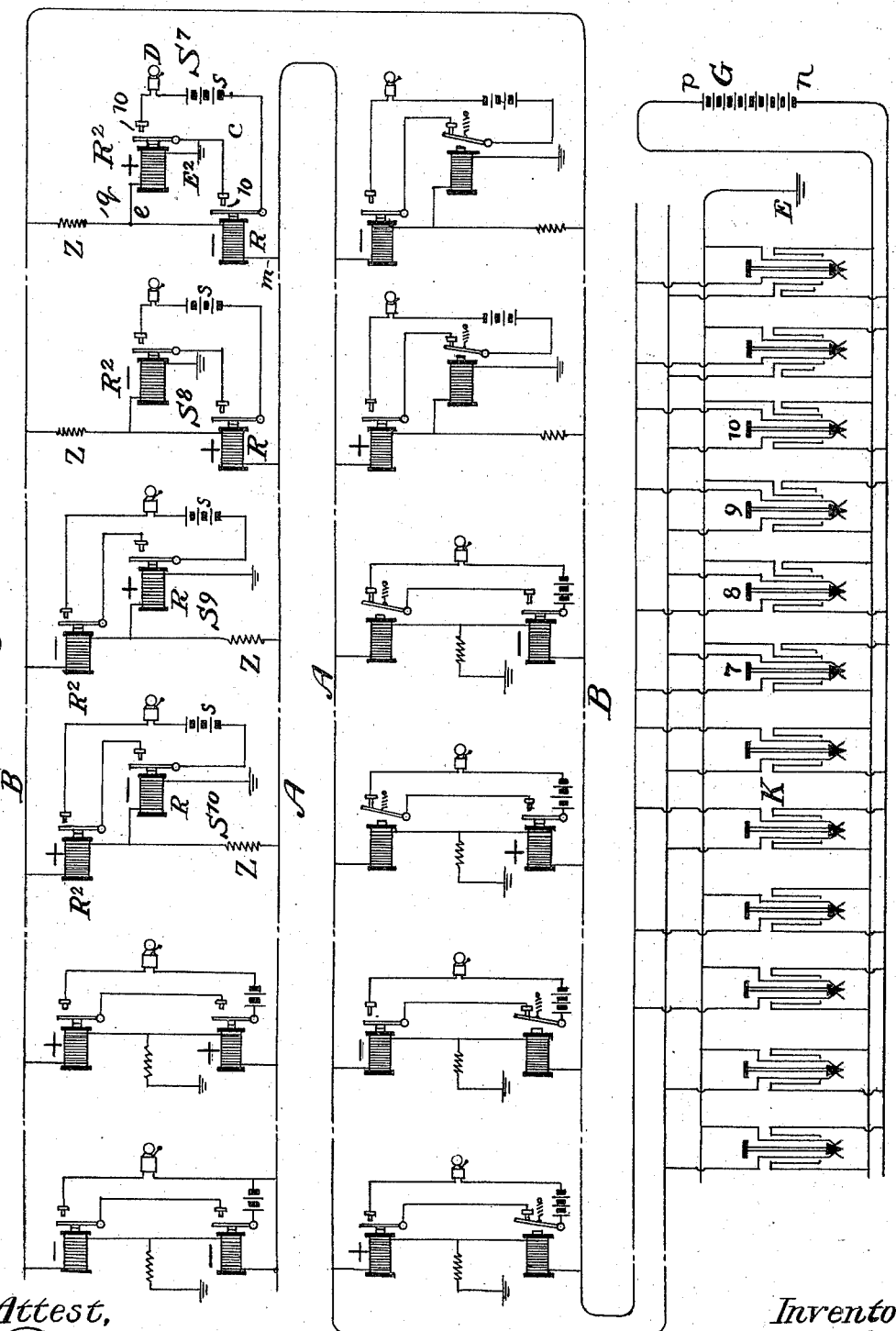

In the drawings which accompany and illustrate this specification, Figure 1 is a simple diagram indicating, graphically, a principle underlying all applications of our invention. Fig. 2 is a table of the currents and current combinations which will most frequently be employed; and Fig. 10 is also a table showing an extended list of such combinations, including four additional ones. Fig. 3 is a diagram of a metallic circuit of eight substations to which our invention is applied, and Fig. 4 indicates a convenient form of polar relay for use in association therewith. Figs. 5 and 7 are diagrams of a portion of a party-line circuit, indicating modifications which may be made of the relays of four of the substations, and Fig. 6 is a detail exemplifying the principle of the relays indicated in one of the said modifications. Fig. 8 is a diagram indicating the application of a portion of our invention to a telephone-circuit of six substations and introducing the locking device and busy-signal, and Figs. 8$^a$ and 8$^b$ represent details of the special relay used to operate these appliances. Fig. 9 is a diagram more clearly and fully illustrating the calling, locking, and telephone circuit and apparatus arrangements of two substations; and Fig. 11 is a diagram illustrating our invention when applied to a metallic circuit serving twelve substations.

Referring for the present to Fig. 3, A and B represent two main conductors extending from a central station C to a number of substations S, $S^2$, $S^3$, &c., and they may be the outgoing and return conductors of a metallic telephone-circuit. At each of the eight substations are two relays R and $R^2$, placed in derived circuits or earth branches $m$ and $q$ of the two main conductors, respectively, which branches may be united at $e$ and have a common earth connection $E^2$, or, as indicated by dotted lines, a common return-conductor X. There is also at each station a signal-receiving device D, usually an electric bell, connected with a battery $s$ in a local circuit $c$, which is capable of being opened and closed at two points 10 and 11 and which stands normally open at either one or both of such points. The relays R and $R^2$ control this local circuit, and when the armature-levers 13 of both rest on the contact-stops 12 the said circuit is closed and the bell will ring, while if the armature-levers of either one be out of contact with its stop the circuit remains open and no signal is given.

It will be observed that the relays of each station differ in some way, either in construction or arrangement, from those of all other stations. Thus at station S the main conductor A is branched through a polar relay made responsive to a plus or positive current and main conductor B through a neutral relay adapted to respond to currents of either direction traversing B. Station $S^2$ also has a neutral relay on B, but a polar relay responsive to a minus current on A. The third and fourth stations have neutral A relays, and polar, plus, and minus current B relays. The fifth and sixth stations have each two polar relays, one of either sign, but reversed at the two stations with respect to the two conductors. Station $S^7$ has two polar relays of plus sign and $S^8$ two polar relays of minus sign.

The form of polar relay shown in the diagram is purely conventional, and it is evident that any form will answer in which a magnetically-polarized poised armature is capable of being normally drawn toward the core of the actuating-helix to hold the local circuit open, or in which the armature uniformly rests while no current is traversing its main circuit in a position to hold the local circuit open, and having been moved from such a position by a current of appropriate direction resumes the same on the cessation of such current. Fig. 4 represents a convenient form of the latter class of relay, and since it is an instrument well known in the art no further remark concerning it is necessary except to say that it can readily be arranged to invariably bring its armature to rest in the desired position by adjusting the pole-pieces so that one shall be a little more forward than the other. Such a relay closes the local circuit at the point it controls under a line-current of direction adapted to create a repulsion between the said nearest pole-piece and the armature, and with a current of opposite direction or with no current at all the local circuit remains open at that point.

The plus and minus signs of all of the polar relays of the system indicate the direction of the current with reference to the central-station end of the conductor, to which the said relays are designed to respond.

The four neutral relays at stations S to $S^4$ are ordinary relays with non-magnetized armatures whose circuit-changing levers are held against their back contact-stops by a spring or by gravity, and these relays act to open their point of the local circuits under any current exciting them without regard to the direction of such current. In these relays the local-circuit contacts 11 of S and $S^2$ and 10 of $S^3$ and $S^4$ stand normally closed when no current is passing in the main conductor, but are opened by current of either sign traversing the main with which they are connected.

At the central station G is a generator of calling-current, and E an earth connection complementary to those at the substations. K is a group of circuit-changing signaling-keys, each key corresponding with one substation appliance, and when any particular key is pressed or operated the relays at the particular substation represented by it will coöperate to close the local circuit and give the signal there; but at the other stations no such effect will take place. Hence in order to give the signal at any desired substation it is only necessary to operate the particular key or call-button which represents such station. For instance, key No. 1 corresponds with substation S, key 2 with substation $S^2$, key 3 with substation $S^3$, &c.

It will be observed that branch terminals $v$ of the main conductor A are brought to contact springs or points in every key except 3 and 4; that similar branches $x$ of the main conductor B are brought to like contact-points in all keys except 1 and 2; that branches $y$ and $z$ from the plus and minus generator-poles are brought to contact-points in every key, and that branch terminals from the earth connection E are brought to contacts in every key except 5 and 6. The arrangement, however, of these terminal contacts in each key is different, the differences corresponding with those of the substation-relay arrangement, and by organizing the contacts of each key in such a manner that the operation of such key will transmit a current combination to which some one pair of substation-relays is responsive we are enabled to signal the several stations selectively.

In key No. 1 the contacts are so disposed that its operation will connect conductor A with the plus generator-pole at contacts $v$ and $y$, the minus pole of the generator with the earth-terminal contacts $z$ and $w$, and will leave conductor B disconnected. By this means a plus current is sent over line A and is distributed through all the A relays at all of the substations in parallel, finding return through the earth branches at the said stations; but as no current is transmitted over line conductor B, all of the eight B relays will remain unaffected. Under these conditions relay R at station S will close the open point 10 of its local circuit, and the point 11 being already closed by the normal position of the armature of relay $R^2$, which has not been changed, the local circuit $c$ of station S will be closed and the bell at this station will be rung; but station $S^2$ will not be signaled because plus currents having no effect on the polar-relay R of minus sign there, its local circuit remains open. Station $S^3$ is not signaled because the only effect of the plus current on main A is to attract the armature of neutral relay R, and thus open the local circuit (which is already open at point 11) at another point 10. Station $S^4$ receives no signal for the same reason. Station $S^5$ is not signaled because, though the plus polar relay on A closes the open point 10 of its local circuit, the said circuit remains open at 11, there being no current on B; station $S^6$ because neither relay is acted upon, R being of minus polarity and $R^2$ having no current; station $S^7$ because R alone is operated, and station $S^8$ because both relays are of minus polarity.

The operation of key 2 is the same as that of key 1, except that the poles of the generator are reversed, the minus pole being united to main A at $z$ and $v$ and the plus pole to earth at $y$ and $w$, conductor B being again left without connection. This operation transmits a minus current on main conductor A and no current on B, and since this is the combination to which the relays of substation $S^2$ respond and coöperatively close their local circuit the bell at this station will be rung. The bell at station S will not ring because its local circuit remains open at the A relay R, and the bells at all other stations will not because their local circuits remain open at the B relays $R^2$.

The operation of keys 3 and 4 duplicates that of 1 and 2, except that the plus and minus currents are transmitted on conductor B, conductor A being left without current, and the result is that these keys will ring stations $S^3$ and $S^4$, respectively.

The fifth key connects the main conductor A with the plus pole of the generator G and conductor B with its minus pole, leaving the earth-conductor disconnected. The two mains are thus united in series and in circuit with the generator, and a current flows in both whose direction in A is plus and in B minus. The A relay of substation $S^5$ being plus and the B relay there being minus, both act to close their local circuit $c$, and the signal is given at this station only. No other station can respond to this combination. At S, though relay R acts to close its local, relay $R^2$ acts to open it; at $S^2$ relay R continues to hold its local open; at $S^3$ and $S^6$ the local will be open at both points; at $S^4$ it will be open at contact 10; at $S^7$ it will remain open at the point 11 of relay $R^2$, and at $S^8$ it will remain open at the point 10 of relay R. Key 6 performs a similar operation, but with the generator, and consequently the current in both mains, reversed, and since the relays of stations $S^6$ are arranged to respond to this combination of a minus current on A and a plus current on B the bell at $S^6$ is rung. Again the seventh and eighth keys will respectively connect the plus and minus poles to both mains in parallel, and in either case the earth connection to the remaining generator-pole, and the signal will be given at $S^7$ for plus currents on both mains and at $S^8$ for minus currents on both mains accordingly. It will be seen that every key transmits a definite and different current or current combination, that each substation-call apparatus is responsive to a definite and different current combination and to no other, and that each call apparatus is paired with a corresponding key, so that the operation of any particular key will always give the call at the corresponding station and at no other.

The principle of the arrangement of the main conductors in this system of signaling may be illustrated by the diagram Fig. 1, and referring thereto we note that currents of both direction may be transmitted between A and $E^2$, as from keys 1 and 2, which transmit current over A to the several substation earth connections; between B and $E^2$, as in the cases of keys 3 and 4; between A and B in both directions, as with keys 5 and 6, and over both A and B to $E^2$ in both directions, as with keys 7 and 8. Four other combinations can be transmitted, if required, and, as will be hereinafter shown, without departing from these principles.

The eight combinations of signaling-current which so far have been considered are graphically indicated in a tabulated form by Fig. 2, which is self-explanatory.

An analysis of the relay combinations will indicate the leading importance of the non-polarized or neutral relays of the first four stations in securing the selective and non-interfering response of the eight call-receiving appliances. The eight stations are divisible into two groups, one of which comprises the first four stations, which are operated by current on one main only, while the other comprises the last four stations, which are operated, selectively, by current upon both mains in the several combinations of polarity shown. So far as the selective operation of the first four stations mutually is concerned the neutral relays are not required, but each one of the combinations of current for the last four lines would call one of the first four stations were it not for the presence and preventive action of the neutral relays. Our invention, however, can be practiced without such neutral relays, and Figs. 5 and 7 illustrate two alternative plans of preventing the interference of the last four current combinations with the first four stations. In these alternative systems no change in the table of current combinations, the calling-generator, or the key arrangement is involved, nor is there any change required in the arrangement or apparatus of stations 5 to 8, inclusive.

In Fig. 5 at each of the first four stations S, $S^2$, $S^3$, and $S^4$ the two relays R $R^2$ are both of the polarized kind and have double windings. The direction of windings is such that a plus current on line conductor A alone, acts upon both relays at station S in such a way that both swing their armatures 13 into contact with their stops 12, and thereby close the local circuit at both continuity-controlling points 10 and 11, so that the bell at station S is rung. This current closes neither point at $S^2$, the point 11 only at $S^3$, and the point 10 only at $S^4$. The transmission of a minus current on conductor A only, gives the signal at $S^2$, because the relays there only are arranged to respond to such a current. In the same way the relays at $S^3$ and $S^4$ are adapted to respond exclusively to plus and minus call-currents transmitted over B alone.

Considering now the effect upon the apparatus of station S when the current combination to which station $S^5$ responds—viz., a current plus in A and minus in B is transmitted—we find that a plus current in A would, if there were no current in B, indeed operate the S bell, but there being an equal current in B, which opposes that of A in relay $R^2$, the local circuit will not be closed at the point 11. Where the connection of either main conductor with its relays is shown in dotted or broken lines, the fact sought to be indicated is that the coil represented by such lines is wound oppositely in direction to the other coil of the same relay. Similar and obvious considerations to those outlined above will therefore show that the first four stations, arranged as in Fig. 5, respond selectively to their appropriate current combinations, which are currents on one main conductor at a time; that with combinations 5 and 6, which have diversely-directed currents in the two mains the effect at stations S to $S^4$ is neutralized in the relays $R^2$, so these combinations will only close the points 10 of the local call-circuits, and that with combinations 7 and 8, which are of like direction in both mains, the effect at stations S to $S^4$ is neutralized in the relays R, so that these combinations will close only the points 11 of the local call-circuits. These double-wound polarized relays at the first four stations therefore effectively protect the bells of these stations from being actuated by the combinations which operate the remaining four stations, and the signals of the eight stations are selectively and independently operative.

In our system an essential requirement is that the relays represented by the neutral relays of the first four substations of the circuit of Fig. 3 shall present closed local contacts 11 when no current is on their respective main conductors, but shall break the local circuit at such point with a current of either polarity. The plan illustrated by Fig. 7 shows this requirement met by polarized relays which have double contacts. Fig. 6 shows the essential parts of such a relay. M is the actuating-electromagnet, having a polarized armature N S poised at one pole and having the other in the field of the magnet-core. A fixed stop 20 has a contact-point 21, and held against this by the spring $r$ is a contact-lever 22, hung on a pivot 25. A right extension $b$ is in contact with the said lever at 11. These parts are so adjusted that the magnetic attraction existing between the armature-pole N and the core of the electromagnet M is sufficiently strong to maintain the contact between the extension $b$ and the lever 22, but is not strong enough to break the contact between the latter and the point 21 against the pull of the spring $r$. Now if a current is passed through M in such a direction as will create an S pole in the core opposite to the N armature-pole the attraction will increase and the contact will at 21 be broken, whereas if an opposite current passes the armature will be repelled and the local circuit $c$, which connects at S with the armature and at $c^2$ with the stop 20, will be broken. A relay of this kind therefore will maintain its local circuit closed only when no current flows through its coils, but opens the said circuit when a current of either direction passes. In Fig. 7 such a relay is substituted for the neutral relay at substations S, $S^2$, $S^3$, and $S^4$, and its function is the same; but as the plan does not otherwise differ from that of Fig. 3 no further description or explanation of it is necessary.

In applying the foregoing principles to a practical multiple-station circuit system it is desirable to reserve two of the current combinations for the operation of locking devices common to all of the stations.

In the system which so far has been described the seventh and eighth combinations have been convenient for this purpose—that is, a plus current over both conductors A and B for locking the telephone apparatus at stations other than that where the circuit is in use and a minus current over both lines for unlocking. Six combinations are thus left for selective station signaling, and unless other combinations are added the number of stations is therefore limited to six, which generally is a sufficient number to be served by a single circuit. The telephone-locking device and a visual busy-signal which has been added thereto are shown in association with the other station apparatus in Figs. 8, $8^a$, $8^b$, and 9. In these an additional electromagnetic apparatus $R^3$ is shown as being placed in circuit with the relays R and R² at each substation, half of its winding being in the earth branch $m$ of relay R and half in the branch $q$ of relay R². These instruments respond at all stations simultaneously to the locking and unlocking currents, but do not respond (except under conditions presently to be named) to any of the call-signal combinations.

Figs. 8ª and 8ᵇ indicate the principles of the locking-magnet we employ. Two electromagnetic helices 40 and 41 have the similar ends of their cores joined by soft-iron yoke-pieces $r^2$ and $r^3$ to form the instrument R³. Two soft-iron polar extensions $h$ and $f$ project from $r^2$ and $r^3$, respectively. A polarized bar-armature $j$, pivoted at 42, has one of its poles, say N, projecting between the pole-pieces $h$ and $f$ and adapted to move to one side or the other under the influences of said pole-pieces. If current is passed through coil 40 only, the magnetic polarity developed will be short-circuited through the yoke-pieces $r^2$ $r^3$ and the core of coil 41, so that very little will be manifested in the pole-pieces $h$ and $f$; and if current be applied to the coil 41 only, the magnetic polarity will be similarly short-circuited, and again little effect will be manifested in the pole-pieces. Again, if current be applied to both coils 40 and 41 in coincident or complementary direction the yoke-pieces $r^2$ and $r^3$ will satisfy the magnetic flux with very little polarity in $h$ and $f$; but if current be applied to coils 40 and 41 in inductively-opposed direction, as will be the case when the seventh and eighth combinations are transmitted, consequent poles of full strength and opposite polarity will be formed at $h$ and $f$. By these means the inductive attraction between the polarized armature $j$ and the pole-pieces will hold the said armature at rest near either pole-piece $h$ or $f$ indifferently, and it will not be displaced or moved by current passing through either coil 40 or 41 alone or by current through both coils if the directions are such that the inductive effects coincide in the magnetic circuit through the yoke-pieces $r^2$ $r^3$; but if the current in coil 40 opposes in effect the current in coil 41 the consequent poles at $h$ and $f$ will move the free end of the polarized armature $j$ to the right or left, according as the polarity of either pole is that which complements or opposes that of the armature. As indicated in Fig. 9, this appliance may serve to actuate the locking-detent and also a visual signal indicating the occupied condition of the circuit. There are of course a variety of ways in which it may be applied, but the arrangement of the drawings is simple and efficient. It shows the free end of the polarized armature $j$ itself adapted to serve as the said locking-detent, and in the figure the telephone apparatus is shown as being locked at substation S², where the said armature has been swung to the left, where its end is brought in front of a pin $j^3$, mounted on the switch-lever L, so that the said lever cannot move even when relieved from the weight of the telephone T; but as at substation S³ the apparatus is free and is shown as being in use, the armature being swung to the right, where its end is not in line with the stud $j^3$. The busy-signal X is shown as a disk bearing the letter "B," affixed to a rod $j^4$, carried by the armature and a windowed screen $j^5$ in front thereof. It is so adjusted that the disk will appear at the window when the armature moves to its locking position and will disappear when the armature moves to its release position. The figures show the circuit connections. From conductor A at each substation the circuit is through relay R and one coil of magnet R³ to earth, and from conductor B it is through relay R² and the remaining coil of magnet R³ to earth. Under these conditions the locking appliance cannot act under the influence of current from either conductor alone, but is responsive solely to a combination in which there is either a plus or a minus current in both circuits. We also show in these figures a branch of the local bell-circuit, which at each station shunts the call-bell and which, leaving the local-circuit conductor 16 on one side of said bell, passes by wire 26 to the winding of one pole-piece $h$ of the auxiliary magnet R³, then by wire 28 to the winding of the other pole-piece $f$, and by wire 27 back to conductor 16, but on the other side of the bell.

The direction of the windings of the pole-pieces $h$ $f$ is such that when in selectively signaling any particular station the local circuit $c$ of such station is closed by the coöperative action of its relays R R² a part of the current from the local battery $s$ passes through the shunt-circuit and round the said pole-pieces, producing in them opposite polarities independently of the line-currents in the main-conductor coils 40 41 of the magnet R³ and of such direction as to move the armature $j$ into its release position. By this arrangement we provide that all the stations of the general circuit may be simultaneously locked by the application of the prescribed locking-current combination and that when the station desired is being signaled the telephone apparatus there may be released individually by the operation of the local ringing-current to the pole-pieces $h$ and $f$, the local battery at such station serving when its circuit is complete to ring the bell by the current in one of its branches and to unlock its apparatus by the current in the other, and as the local circuits of other stations are not closed the apparatus at the said stations is not released.

Fig. 8 illustrates diagrammatically the electrical arrangement of a line of six substations and a central station, together with the normally-connected apparatus of the latter, and indicates one way in which incoming calls may be transmitted. P is a switch-plug adapted to fit the spring-jack J and having two conductors A² B², which are assumed to connect with the signaling-keys. I is a differentially-wound annunciator, and G² is a normally-connected current-generator. The annunciator-circuit leads from the separable spring-jack contact of main conductor through one of the said differential windings 31, then back through the other, 32, to the separable spring-jack contact of conductor B. At a point 60 between the two windings a conductor 30, leading from the generator G², whose other pole is grounded, is attached. The relative direction of the annunciator-windings is such that the current from the generator G² circulates round the core in both directions and divides on equal terms between the main conductors A and B, finding return by the earth connections E² of the several substations. The current flowing to the two conductors from generator G² is shown as being minus. This is so arranged that the said current may correspond with the unlocking-current on both lines, and hence will not disturb the normal conditions at the stations.

At each substation there is associated with the telephone-hook switch-lever L a contact-spring $d$, having an earth connection and so placed that it will not touch the hook-lever when the same is at either of its range limits, but will be in rubbing contact therewith and make a momentary ground connection of practically no resistance for the lever, and consequently for that main conductor with which it is directly connected as the said lever moves in either direction. Thus when the circuit is not being used for conversation and the telephones at all stations are hung on their respective hooks the generator G² sends a minus current differentially through the annunciator and equally over both mains in parallel. The removal now of any telephone from its hook brings about a momentary and direct connection between the main conductor B and the earth, suddenly reducing the resistance of the said conductor and causing the portion of the current which flows through the B winding of the annunciator to greatly preponderate. The core of the annunciator will thus be magnetized, its armature will be attracted, and its shutter released, giving the signal. When a substation is to be signaled, the plug P is inserted into the socket of the spring-jack J, which cuts off the annunciator and connects the keys K with that particular circuit. Key 7, or the key which sends a plus current over both mains in parallel, is then operated to lock the apparatus at all stations without ringing any of the station-bells. Then the key representing the desired station is pressed, which results in ringing the bell and releasing the telephone apparatus at such station by means of the local battery there without affecting the bells or lock devices of any of the other stations. At the close of any communication key 8 or the key controlling the unlocking-current—viz., a minus current over both mains in parallel—is operated to release the apparatus at all stations.

While, as has been stated, the eight current combinations which so far have been considered are sufficient for ordinary practice, we are not restricted to these and may add others where required.

The table of Fig. 10 shows four additional current combinations which may be utilized, and the diagram Fig. 11 represents a circuit of twelve substations, all of which by the aid of these combinations may be selectively signaled.

For the sake of simplicity the locking devices are omitted from Fig. 11, but it is readily to be understood that an alternative circuit would be one of ten stations each fitted with the locking devices which have been described.

The four additional current combinations are those which in Fig. 10 are the seventh, eighth, ninth, and tenth of the table, the seventh and eighth combinations of the original table, Fig. 2, having here been advanced to the eleventh and twelfth positions, it being convenient in this arrangement also to employ these particular combinations in the locking and unlocking arrangements when such operations are to be performed. In Fig. 11, however, we do not introduce the locking devices and their connections, as when employed they would not in any respect differ from those already shown and described, and the drawings simply show how the call apparatus of more substations may be added to the eight of Fig. 3 and operated selectively.

Of the additional combinations, as indicated by table, Fig. 10, No. 7 is produced by depressing key 7, whereby the main conductor A and the central-station earth connection are both united to the minus pole $n$ and main conductor B to the plus pole $p$ of the call-current generator G. This action connects the generator in two circuits, one a metallic circuit utilizing both mains and the other a grounded circuit extending from the central-station earth connection to the substation earth connections in parallel. The calling apparatus of substation S⁷ is so arranged that its call apparatus only will be rung by this combination. It has a minus relay R in the earth branch from main conductor A, no relay in the branch $q$ from main B, and a plus relay R² in the common earth connection E², formed by the coalition at $e$ of the two earth branches. The local circuit $c$ will be closed at the points 10 and 11, governed by both relays, and the bell D will give the signal. Combinations 8, 9, and 10 are produced by the operation of keys 8, 9, and 10, respectively, and give the signal at substations S⁸, S⁹, and S¹⁰, respectively. The arrangement of the key apparatus circuits and substation-call apparatus for these combinations is similar to that for No. 7, but the factors are transposed. Key 8, for example, connects conductor A and the earth E with the plus pole of the generator and conductor B with its minus pole, which causes a current of plus direction in the metallic circuit through the plus-polarized relay R and a current of minus direction in the earth-completed circuit of conductor B alone, which includes the minus relay $R^2$ at substation $S^8$. For substation $S^9$ the operation of key 9 causes a plus current over A and a minus current over B in the metallic circuit containing the minus relay $R^2$ of B and a plus current in the grounded circuit over main A, which contains the plus relay $R^2$, for in this case the plus generator-pole unites with A and the minus pole with B and the earth; and key 10, connecting the plus generator-pole with B and E and the minus pole with A, will produce a plus current over B and a minus current over A in the metallic circuit, which includes the plus relay $R^2$, and a minus current in the earth-circuit, of which A is the sole main conductor and which contains the minus relay R, and the signal is therefore given at substation $S^{10}$. For this arrangement it may be noted that the relay connections at the first four and last two stations do not differ from those disclosed by Fig. 3. At the other six stations one of the two relays is placed in the main or coalition earth-conductor leading from $e$ to $E^2$; and also, that at stations 5 and 6 the relays $R^2$ so placed are neutral relays, or such as will respond to all currents of sufficient strength passing to earth there without regard to direction.

A balancing-resistance Z is provided at each substation in that branch of the three-way earth connection which is not occupied by one of the two relays, and we prefer to make the magnitude of this resistance substantially equal to that of one relay, so that at any station the resistances measured from the junction-point to the mains A and B and the earth $E^2$ shall be alike. The use of the said resistances Z is to secure a symmetrical distribution of the several currents at all stations.

The local battery $s$ of any substation may, if desired, be, as indicated in Fig. 9, the same as that furnished to supply current for the telephone-transmitter T $r$, which is shown as being placed together with the primary winding 70 of its induction-coil 12 in an alternative circuit of the said battery controlled by the contact 72 of the telephone-switch L.

We are aware that attempts have been made to signal selectively by means of combinations of line conductors, and also by combinations of currents and combinations of relays; but we are not aware that it has heretofore been proposed to combine these three features in a homogeneous system whereby a large number of stations may be signaled selectively and whereby with an extremely simple arrangement of both circuits and apparatus any particular station may be signaled to the exclusion of all others by a single pressure applied to a single key; and

We claim as our invention—

1. An electric signaling system comprising a metallic or double-conductor main circuit extending between a central station and a number of substations; a selective-signal apparatus consisting of a signal-receiving device in a local circuit controlled by two relays at each substation, the receiving device at each station being selectively responsive through the said relays to a definite and separate or different main-circuit current or current combination; and at the central station, a source of calling-current; an earth-conductor; and a series of keys representing respectively the said substations, and controlling the connection of the two main-circuit conductors, the call-current source, and the said earth-conductor terminals, each key being organized to establish a different relation of the said terminals, and adapted thereby to transmit over one or both of the said main-circuit conductors, the particular current or current combination to which the receiving device of the substation represented by such key and no other, is responsive, substantially as hereinbefore specified.

2. In a selective-signaling system, the combination of two main-line conductors extending from a central station to a number of substations; a current-generator at the central station; a group of circuit-changing keys also at the central station controlling the ends of the said main-line conductors, the poles of the said call-generator, and an earth connection, the several keys being organized to establish different relative arrangements of these factors, for the transmission at will of plus and minus currents over either main conductor alone, over both at once in parallel, and over both in series or when formed into a metallic circuit; and a normally open local circuit containing a call-bell at each substation, controlled by relays, the said two relays of each station being adapted to coöperate, and to close their local bell-circuit, and so give the call-signal, in response to one particular combination only of main conductor and current, and to the operation of some definite one of the said keys, substantially as specified herein.

3. The combination in a system of selective signaling, of the two conductors of a metallic telephone-circuit extending between a central station and a number of substations, each conductor having an earth branch at each substation; a signal-current generator, a complementary earth connection, and a number of signaling-keys at the central station, each of said keys being adapted to establish a different association of the main conductor, generator and earth connection terminals, and thereby to transmit a current combination distinct from that of any other key; a signal-receiving device in a local circuit capable of being opened and closed at two points, at each substation; and two relays at each substation connected in the earth or return branches of the main conductors respectively, and controlling each, one of the said local circuit opening and closing points, the character, polarity and mode of connection with the main conductors of the said relays being diverse at each station; whereby the said relays of each substation are adapted to close their respective local circuit at both points, and to operate the signal device at such substation, in response to the current combination transmitted by a particular one only of the said keys, substantially as and for the purposes specified.

4. In a system of selective signaling the combination of the two conductors of a metallic party-line telephone-exchange circuit; two relays at each substation of the said circuit in derived circuits of the said conductors, the relays of each station being arranged differently with respect to character, polarity, or circuit connection, and made thereby responsive to a signaling current or current combination different for each station; a local circuit at each station having two points controlled by the said relays respectively, where it may be closed and opened; a call-signal device included in said local circuit, and adapted to operate and give the signal when the same is closed; and means for transmitting through the said metallic circuit, or through either or both of its conductors at will, the particular signaling current or current combination to which any of the said pairs of substation-relays is responsive, whereby any of the substation local circuits may be selectively closed, and the signal given at such substation to the exclusion of the others.

5. In a system of selective signaling, the combination with the two conductors of a metallic telephone-circuit extending from a central station to a number of substations; of substation-signaling apparatus at four of the several stations comprising a polar and a neutral relay, and at the remaining stations comprising two polar relays, the relays of each station being connected differently in derived circuits of the two main conductors, and adapted at each to control a local circuit including a signal-bell; and a current-generator and two sets of signal-sending keys at the central station, the keys of one set being adapted to connect the poles of the generator diversely, to one or the other of the main conductors for the selective operation of the single polar relay of the said four stations; and the keys of the other set being adapted to connect the said generator-poles diversely with both of the said main conductors for the selective operation of the two polar relays of the remaining stations substantially as described.

6. In a telephone system the combination of the two conductors of a metallic telephone-circuit; a central station at one end of such circuit; a call-current generator, and a number of signal-sending keys at said central station, the said keys being organized to establish a like number of different permutation connections of the said circuit conductors and generator, and thereby to transmit over either or both of the said main conductors a similar number of distinctive currents or current combinations; a series of substations equal in number to the said keys less two, connected with the said two main-circuit conductors and a selective-signaling apparatus at each of the said substations, controlled by relays in earth branches of the said two conductors responsive exclusively to the operation of a corresponding one of the said keys, and to the particular current combination transmitted thereby; with a telephone-locking device, and busy-signal at each substation, actuated by a polarized electromagnet in the circuit of the station earth branches, the said locking-magnets of all stations being collectively responsive in locking and unlocking to the operation of the remaining two keys, and the current combinations respectively, substantially as herein set forth.

7. The combination substantially as hereinbefore described, in a telephone system, of a metallic telephone-circuit; a central station from which such circuit extends; a source of signaling-current supply, and a number of signal-sending keys at said central station, the said keys being adapted to establish a like number of different permutations of the circuit conductor and generator connections, and thereby to transmit by means of either or both of the said circuit-conductors, a similar number of distinctive currents or current combinations; a series of substations equal in number to the said keys, less two, connected with the said main circuit-conductors; with a selective-signaling apparatus at each station, consisting of a signal-bell in a normally open local circuit, controlled by two relays in earth branches of the said main conductors respectively, each pair of relays being responsive exclusively to the operation of a corresponding one of the said keys, and to the particular current combination thereof; a series of polarized electromagnets (one at each station, in circuit with the relays thereof, controlling a telephone-locking device and busy-signal), collectively responsive in locking and unlocking to the operation of the remaining two keys, and their current combinations respectively; and an auxiliary winding on the core of said magnet included in the local call-circuit of the station, to excite the said magnet, and to actuate it to unlock the telephones at a called station, independently of the central-station unlocking-current combination; substantially as described and for the purposes set forth.

8. The combination in a telephone system, with a number of selective-signaling appliances each at a different substation of the same circuit, and each comprising two relays, and a normally open local circuit controlled thereby containing a signal-bell, the pairs of relays of the several stations being each adapted to respond selectively to a different and distinctive current combination transmitted over the main circuit-conductors; of a telephone-locking and busy-signal device at each station actuated by an independent polarized electromagnet in circuit with the station-relays, the said magnets of all stations being collectively responsive both in locking and unlocking, to two additional distinctively main-line current combinations; and means consisting of an auxiliary exciting-helix of the lock-actuating magnet, connected with the local calling-circuit, and made operative by the closure of such circuit to give the signal, for automatically unlocking the telephones at the called station only substantially as described.

9. The combination in a telephone system, of the two conductors of a metallic circuit extending from a central station to six substations; with six signaling-keys at the central station, organized and adapted to transmit over the said conductors a like number of different call-current combinations, to wit: plus and minus currents over each conductor separately, and plus and minus currents over the two conductors arranged serially as a metallic circuit; a normally open local signaling-circuit at each substation containing a signal-bell, and capable of being opened and closed at two separate points; and two relays differently combined at each substation connected in earth branches of the said two main conductors respectively, and controlling the said two points in the station local circuit, each set of relays being adapted to respond to a definite and different one of the said current combinations, and to no other, and thereupon to close its local circuit, and sound its call-signal selectively.

10. In a telephone system, a selective-signaling circuit comprising the following elements: the two main conductors of a metalilc circuit extending from a central station to six substations, a group of eight circuit-controlling and signaling keys at the central station, organized and adapted to connect the terminals of the said main conductors with the terminals of a signaling-current generator as many different ways, and to transmit over the said conductors a like number of different current combinations, to wit: plus and minus currents over each conductor separately, plus and minus currents over the two conductors arranged serially as a metallic circuit, and plus and minus currents over both conductors jointly in parallel; a normally open local signaling-circuit at each substation containing a signal-bell, and capable of being opened and closed at two separate points; a differently-combined pair of relays, at each substation, connected in earth branches of the said two main conductors respectively, and controlling the said two points in the station local circuit, each pair being responsive to a different one of the said keys and current combinations for the selective operation of its own signal-bell; a telephone-switch-locking device at each substation; and a polar relay in circuit with the two signaling-relays controlling the same, the said polar relays of all stations being of like character and arrangement, and adapted to respond collectively to the remaining two keys and current combinations, for the simultaneous setting and releasing of the said locking devices of the several stations; substantially as set forth.

11. In a telephone signaling system, the combination of the two main conductors of a metallic circuit connecting a number of substations with a central station; with a series of local circuits each containing a signal-bell, one for each substation; and a series of relays two for each substation, connected in derived circuits of the two main conductors respectively; the currents to which said pairs of relays are responsive differing from each other in direction over both main conductors severally connected in circuits completed through the earth or through a common return-conductor, in direction over the two conductors connected in series, and in direction over the two conductors connected in parallel, whereby any pair of said relays but only one pair at a time, may be operated to close its local circuit, as set forth.

In testimony whereof we have signed our names to this specification, in the presence of two subscribing witnesses, this 21st day of November, 1896.

GEORGE W. WHITTEMORE.
JOHN A. BARRETT.
WARREN M. CRAFT.

Witnesses:
ARTHUR A. MARSTERS,
HARRY H. BRIGHAM.